United States Patent
Righi et al.

(10) Patent No.: US 10,754,661 B1
(45) Date of Patent: Aug. 25, 2020

(54) NETWORK PACKET FILTERING IN NETWORK LAYER OF FIRMWARE NETWORK STACK

(71) Applicant: American Megatrends International, LLC, Norcross, GA (US)

(72) Inventors: Stefano Righi, Lawrenceville, GA (US); Madhan B. Santharam, Duluth, GA (US); Arun Subramanian Baskaran, Duluth, GA (US)

(73) Assignee: American Megatrends International, LLC, Norcross, GA (US)

( * ) Notice: Subject to any disclaimer, the term of this patent is extended or adjusted under 35 U.S.C. 154(b) by 262 days.

(21) Appl. No.: 15/618,374

(22) Filed: Jun. 9, 2017

(51) Int. Cl.
| | | |
|---|---|---|
| *G06F 9/00* | (2006.01) | |
| *G06F 15/177* | (2006.01) | |
| *G06F 9/4401* | (2018.01) | |
| *H04L 12/46* | (2006.01) | |
| *H04L 29/12* | (2006.01) | |
| *H04L 29/06* | (2006.01) | |

(52) U.S. Cl.
CPC ........ *G06F 9/4416* (2013.01); *H04L 12/4641* (2013.01); *H04L 61/103* (2013.01); *H04L 63/0227* (2013.01); *H04L 63/0876* (2013.01); *H04L 61/6022* (2013.01); *H04L 61/6059* (2013.01)

(58) Field of Classification Search
CPC ....................................................... G06F 9/44
See application file for complete search history.

(56) References Cited

U.S. PATENT DOCUMENTS

| | | | | |
|---|---|---|---|---|
| 7,404,008 B2 * | 7/2008 | Takeuchi | .......... | H04L 29/12066 370/392 |
| 2005/0091387 A1 * | 4/2005 | Abe | .................... | G06F 9/4405 709/228 |
| 2008/0204193 A1 * | 8/2008 | Zai | ......................... | H04W 4/08 340/10.1 |
| 2009/0113046 A1 * | 4/2009 | Yajima | .................... | H04L 41/26 709/224 |
| 2010/0329184 A1 * | 12/2010 | Haddad | ................. | H04W 8/082 370/328 |
| 2016/0036767 A1 * | 2/2016 | Gillon | ................. | H04L 61/6022 709/226 |
| 2016/0308886 A1 * | 10/2016 | Lee | ...................... | H04L 63/1441 |
| 2017/0048304 A1 * | 2/2017 | Singh | ...................... | H04L 67/06 |

* cited by examiner

*Primary Examiner* — Mohammed H Rehman
(74) *Attorney, Agent, or Firm* — Newport IP, LLC; Leonard J. Hope

(57) ABSTRACT

A firmware, such as a unified extensible firmware interface (UEFI)-compliant firmware, provides a network protocol stack in a pre-boot execution environment. A network layer in the network protocol stack receives network packets. A firmware driver executing in the network layer determines whether individual network packets received at the network layer meet one or more pre-defined criteria. If individual network packets meet the pre-defined criteria, the firmware driver provides the network packets to a transport layer in the network protocol stack. If, however, the network packets received at the network layer do not meet the pre-defined criteria, the firmware driver discards the individual network packets.

20 Claims, 5 Drawing Sheets

NETWORK PACKET FILTERING IN NETWORK LAYER OF FIRMWARE NETWORK STACK

BACKGROUND

In many computing systems, low-level instruction code, or firmware, is used to configure hardware components in preparation for booting an operating system. For example, and without limitation, some computing systems utilize firmware that is compliant with a specification released by the Unified EFI ("UEFI") Forum (the "UEFI Specification"). Such a firmware might be referred to herein as a UEFI Specification-compliant firmware, a UEFI-compliant firmware, or a UEFI firmware. Other types of firmware implementations perform similar functions.

UEFI firmware is executed as a single thread. As a result, the network stack provided by UEFI firmware must read network packets utilizing polling. Processing all of the network packets obtained during each polling operation can, however, take a long time. This approach works reasonably well when a computing system implementing such a firmware acts as a network client. If such a computing system acts as a network server, however, the polling mechanism described above can result in the computing device taking an extended amount of time to accept network connections. This can result in network clients timing-out. As a result, network performance and other types of computing tasks that are dependent upon network performance can be negatively impacted.

It is with respect to these and other considerations that the disclosure made herein is presented.

DETAILED DESCRIPTION

Figure 1:
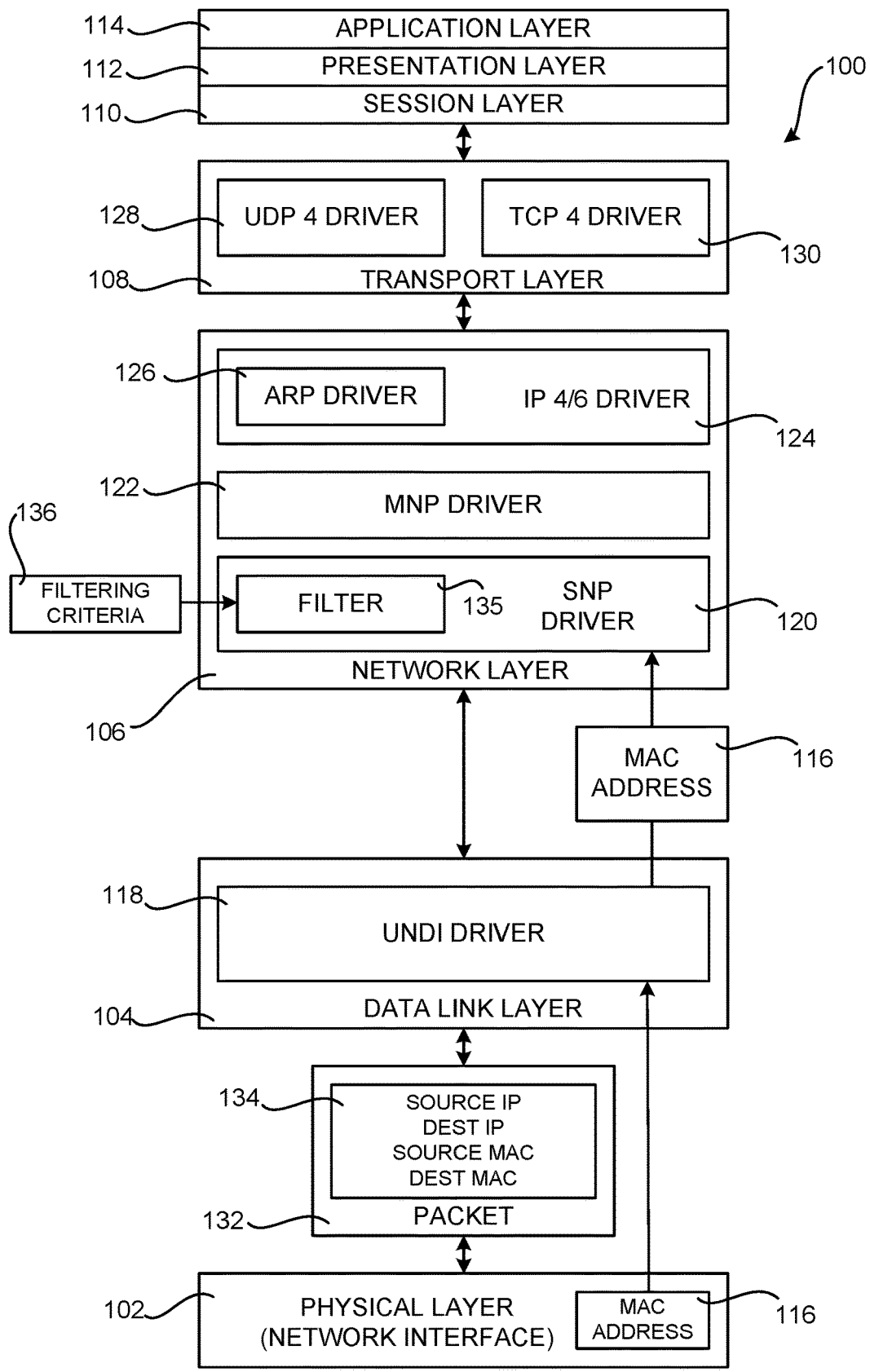
FIG. 1 is a software architecture diagram that illustrates aspects of one mechanism disclosed herein for filtering network packets in a network layer of a network stack provided by a firmware, according to one embodiment.

Technologies for filtering network packets in a network layer of a network stack provided by a firmware are disclosed herein. Through an implementation of the technologies presented herein, network packets processed by a network stack provided by a firmware executing in a single thread can be processed more efficiently. This can reduce network time-outs, improve network performance, and improve the performance of other computing tasks or resources that are dependent upon network connections. Other technical benefits can also be realized through an implementation of the disclosed technologies.

In one particular implementation, a firmware, such as a UEFI-compliant firmware, provides a network protocol stack in a pre-boot execution environment. A network layer in the network protocol stack receives network packets. A firmware driver executing in the network layer determines whether individual network packets received at the network layer meet one or more pre-defined criteria.

If individual network packets meet the pre-defined criteria, the firmware driver provides the network packets to a transport layer in the network protocol stack. If, however, the network packets received at the network layer do not meet the pre-defined criteria, the firmware driver discards the individual network packets. By discarding packets at the network layer of firmware-provided network protocol stack in this manner, a single-threaded firmware can process more packets and more quickly than in previous implementations. As mentioned above, this can reduce network time-outs and provide other performance benefits.

It is to be appreciated that the above-described subject matter can also be implemented as a computer-controlled apparatus, a computer process, a computing system, or as an article of manufacture such as a non-transitory computer-readable storage medium. These and various other features will be apparent from a reading of the following Detailed Description and a review of the associated drawings.

This brief summary of the disclosed subject matter provided above is intended to introduce a selection of concepts in a simplified form that are further described below in the Detailed Description. This summary is not intended to identify key features or essential features of the claimed subject matter, nor is it intended that this summary be used to limit the scope of the claimed subject matter. Furthermore, the claimed subject matter is not limited to implementations that solve any or all disadvantages noted in any part of this disclosure.

In the following detailed description, references are made to the accompanying drawings that form a part hereof, and in which are shown by way of illustration specific configurations or examples. Referring now to the drawings, in which like numerals represent like elements throughout the several FIGS., aspects of an exemplary operating environment and the various technologies provided herein will be described.

While the configurations presented herein are described in the general context of program modules that execute in conjunction with the execution of a computer firmware, those skilled in the art will recognize that various configurations can also be implemented in combination with other program modules. Generally, program modules include routines, programs, components, data structures, and other types of structures that perform particular tasks or implement particular abstract data types. Moreover, those skilled in the art will appreciate that the invention can be practiced with other computer system configurations, including handheld devices, multiprocessor systems, microprocessor-based or programmable consumer electronics, minicomputers, mainframe computers, embedded systems, and the like. Configurations presented herein can also be practiced in distributed computing environments where tasks are performed by remote processing devices that are linked through a communications network. In a distributed computing environment, program modules can be located in both local and remote memory storage devices.

Figure 4:
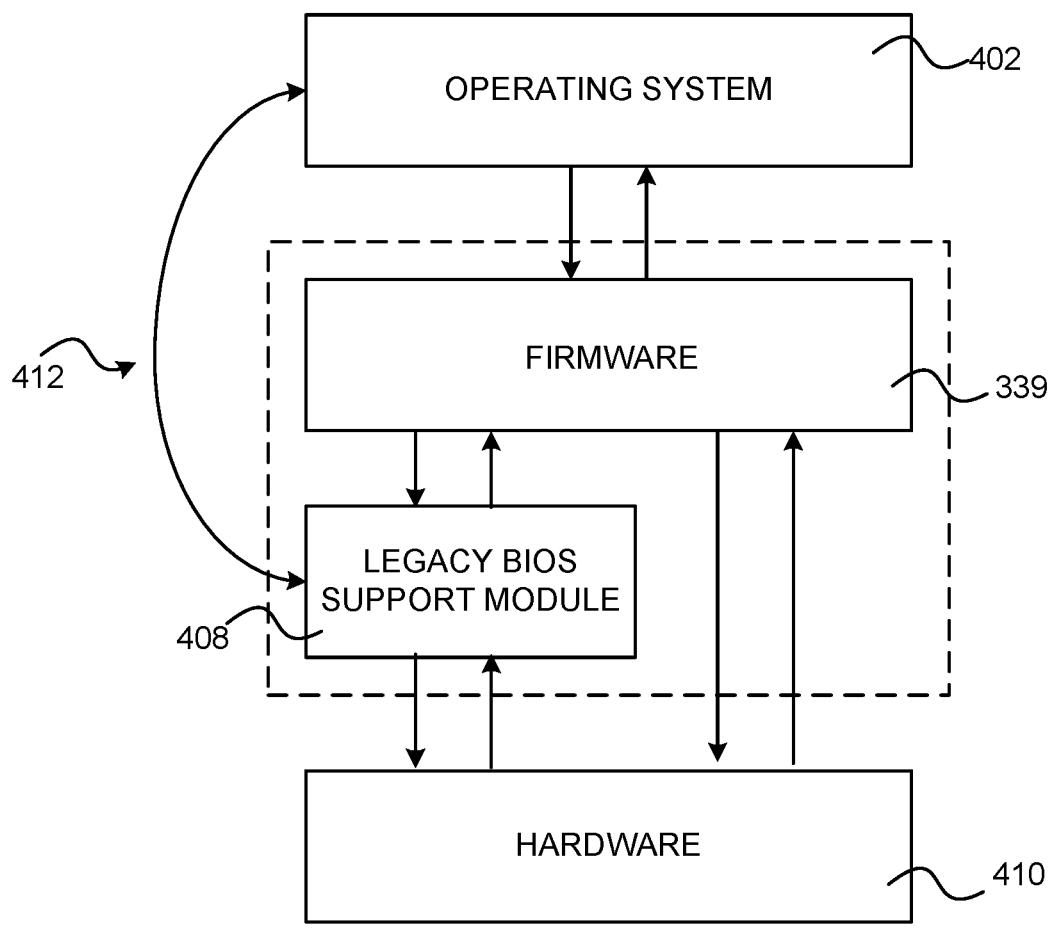
FIG. 4 is a software architecture diagram illustrating aspects of an interface between a UEFI Specification-compliant firmware and an operating system according to one or more configurations presented herein.
Figure 5:
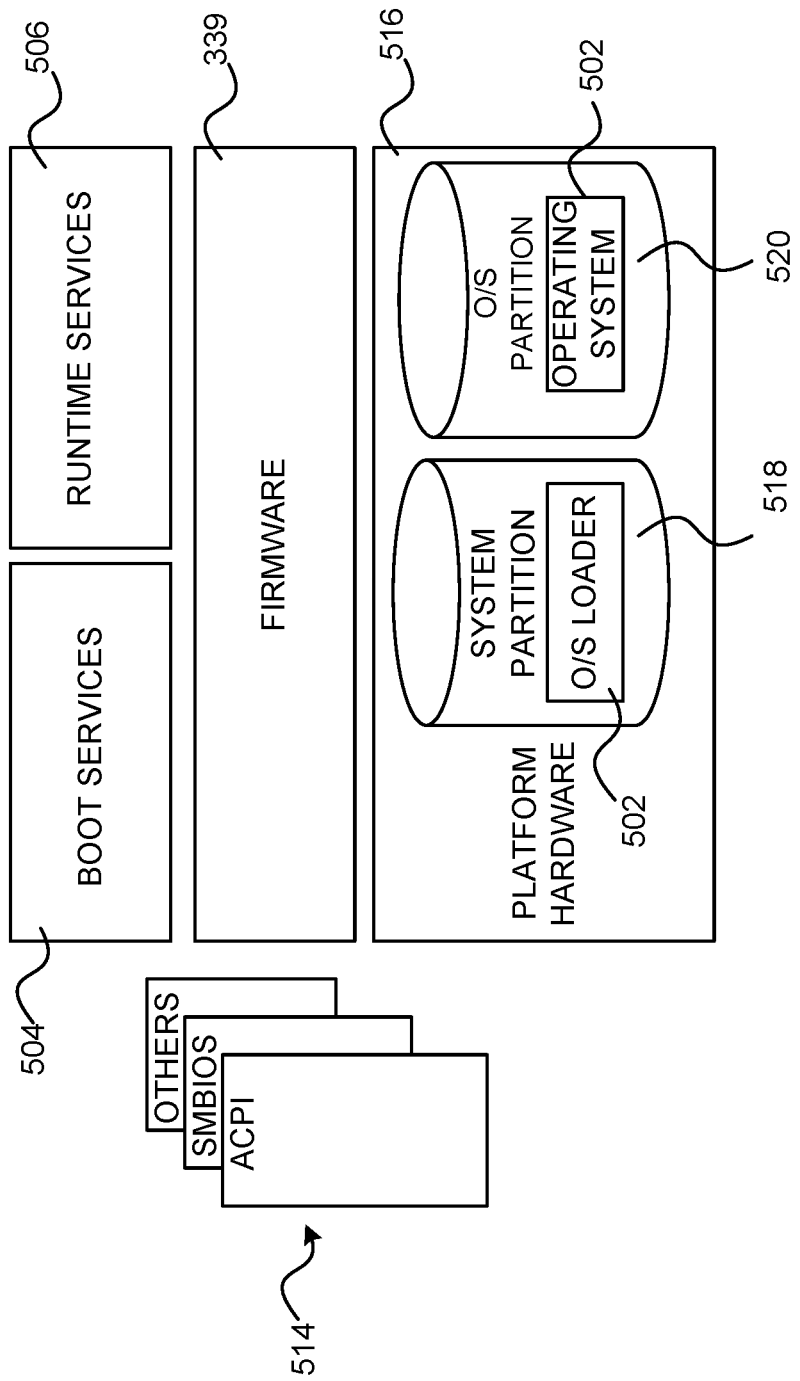
FIG. 5 is a software architecture diagram illustrating an architecture for a UEFI Specification-compliant firmware that provides an operating environment for one or more configurations presented herein.

FIG. 1 is a software architecture diagram that illustrates aspects of one mechanism disclosed herein for filtering network packets in a network layer of a network stack provided within a firmware-provided pre-boot execution environment, such as that provided by a UEFI Specification-compliant firmware. Such a firmware, which is described in greater detail below with regard to FIGS. 4 and 5, provides a set of software routines that boot an operating system and provide a limited set of run time services. As mentioned above, such a firmware might be referred to herein as a UEFI Specification-compliant firmware, a UEFI-compliant firmware, a UEFI firmware, or simply a firmware.

As shown in FIG. 1, a firmware such as that described briefly above can provide a network protocol stack 100 (which might be referred to herein as the "network stack 100" or just the "stack 100"). The network stack 100 includes a number of layers, which might include a physical layer 102, a datalink layer 104, a network layer 106, a transport layer 108, a session layer 110, a presentation layer 112, and an application layer 114. Various components within the firmware, some of which are described below, can be utilized to implement the various layers of the network stack 100.

The physical layer 102 consists of the networking hardware transmission technologies of a network. This layer underlies the logical data structures of the higher level functions in a network. In particular, the physical layer 102 defines the means of transmitting raw bits rather than logical data packets 132 over a physical link connecting network nodes. The bit stream may be grouped into code words or symbols and converted to a physical signal that is transmitted over a hardware transmission medium. The physical layer 102 provides an electrical, mechanical, and procedural interface to the transmission medium. Within the semantics of the network stack 100 shown in FIG. 1, the physical layer 102 translates logical communications requests from the data link layer 104 into hardware-specific operations to cause transmission or reception of electronic signals.

The physical layer 102 can include, but is not limited to, a physical network interface, such as an Ethernet controller. Such a network interface can be assigned an unique media access control ("MAC") address 116 and an internet protocol ("IP") network address (not shown in FIG. 1). A MAC address 116 of a computer is a unique identifier assigned to network interfaces for communications at the data link layer 104 of a network segment. MAC addresses 102 are used as a network address for most IEEE 802 network technologies, including Ethernet and Wi-Fi.

The data link layer 104 of the network stack 100 is a protocol layer that transfers data between adjacent network nodes in a wide area network ("WAN") or between nodes on the same local area network ("LAN") segment. The data link layer 104 provides the functional and procedural means to transfer data between network entities and might provide the means to detect and possibly correct errors that may occur in the physical layer 102.

In the UEFI network protocol stack 100 shown in FIG. 1, aspects of the functionality provided by the data link layer 104 is implemented by a universal network device interface ("UNDI") driver 118. The UNDI driver 118 is an application programming interface ("API") for network interface cards used by the Preboot Execution Environment protocol provided by a UEFI-compliant firmware.

The network layer 106 provides data routing paths for network communication. Data is transferred in the form of packets via logical network paths in an ordered format controlled by the network layer. In the embodiment shown in FIG. 1, the network layer 106 is implemented by a simple network protocol ("SNP") driver 120, a managed network protocol ("MNP") driver 122, and an internet protocol ("IP") v4 and/or v6 driver 124. The driver 124 can further include an address resolution protocol ("ARP") driver 126. As known to those skilled in the art, ARP is a protocol used by the IP [RFC826], specifically IPv4, to map IP network addresses to the hardware addresses used by a data link protocol.

The transport layer 108 provide host-to-host communication services for applications. It provides services such as connection-oriented data stream support, reliability, flow control, and multiplexing. In one embodiment, a UEFI-compliant firmware can implement aspects of the transport layer 108 through a transmission control protocol ("TCP") v4 (or v6) driver 130 and a user datagram protocol ("UDP") 4 driver 128. TCP/IP is used for connection-oriented transmissions, whereas the connectionless UDP is used for simpler messaging transmissions.

The session layer 110 provides mechanisms for opening, closing and managing a session between end-user application processes, i.e., a semi-permanent dialogue. The presentation layer 112 is used to present data to the application layer 114 in an accurate, well-defined and standardized format. The presentation layer 112 is sometimes called the "syntax layer." The application layer 114 consists of protocols that focus on process-to-process communication across an IP network and provides a firm communication interface and end-user services.

As illustrated in FIG. 1, network packets, such as the network packet 132, proceed up or down through the various layers of the UEFI network protocol stack 100. As also shown in FIG. 1, each network packet 132 includes various types of data 134 including, but not limited to, a source IP address for the packet 132, a destination IP address for the packet 132, a source MAC address for the packet 132, and, optionally, a destination MAC address for the packet 132. Packets 132 include additional information such as, but not limited to, a data payload, header information, protocol-identifying information, and source and destination port information.

It is to be appreciated that a UEFI-compliant firmware (and other types of firmware) can implement the various network protocol layers described above using various components not specifically identified herein. Specific components for implementing the technologies disclosed herein according to one embodiment are described in detail below. Other components operating within a firmware can provide the disclosed functionality in other embodiments.

In the embodiment shown in FIG. 1, the SNP driver 120 implements a filter 135. As will be described in greater detail below, the filter 135 is a software component configured to operate within the network layer 106 and to filter network packets 132 received from the data link layer 104. By filtering packets 132 at the network layer 106, the filter 135 can ensure that certain network packets 132 will not be provided to layers that are higher in the UEFI network protocol stack 100 (e.g. the transport layer 108, the session layer 110, the presentation layer 112, and the application layer 114).

In one embodiment, the filter 135 utilizes pre-defined filtering criteria 136. The filtering criteria 136 define the various characteristics of network packets 132 that are to be filtered by the filter 135. The filtering criteria 136 can be provided by other components implementing the network stack 100 such as, but not limited to, the UDP 4 driver 128, the TCP v4 driver 130, the IP v4/v6 driver 124, the MNP driver and, potentially, other components. If network packets 132 are received by the SNP driver 120 that do not match the filtering criteria 136, these network packets 132 will be dropped (i.e. not provided to the transport layer 130).

Using the filtering criteria 136, network packets 132 can be filtered based upon the source or destination MAC address, whether the network packet 132 has been tagged as a virtual LAN packet, protocol type (e.g. UDP, ARP, or TCP/IP), source or destination port numbers, or source or destination IP addresses. It is to be appreciated, however, that other types of filtering criteria 136 can be utilized in other embodiments. Additional details regarding one configuration for filtering network packets 132 in the network layer 106 of a network stack 100 provided by a UEFI firmware are provided below with regard to FIG. 2. In this regard, it is also to be appreciated that the filtering criteria 136 utilized in the example shown in FIG. 2 are merely illustrative and that other types and combinations of filtering criteria 136 can be utilized in other embodiments.

Figure 2:
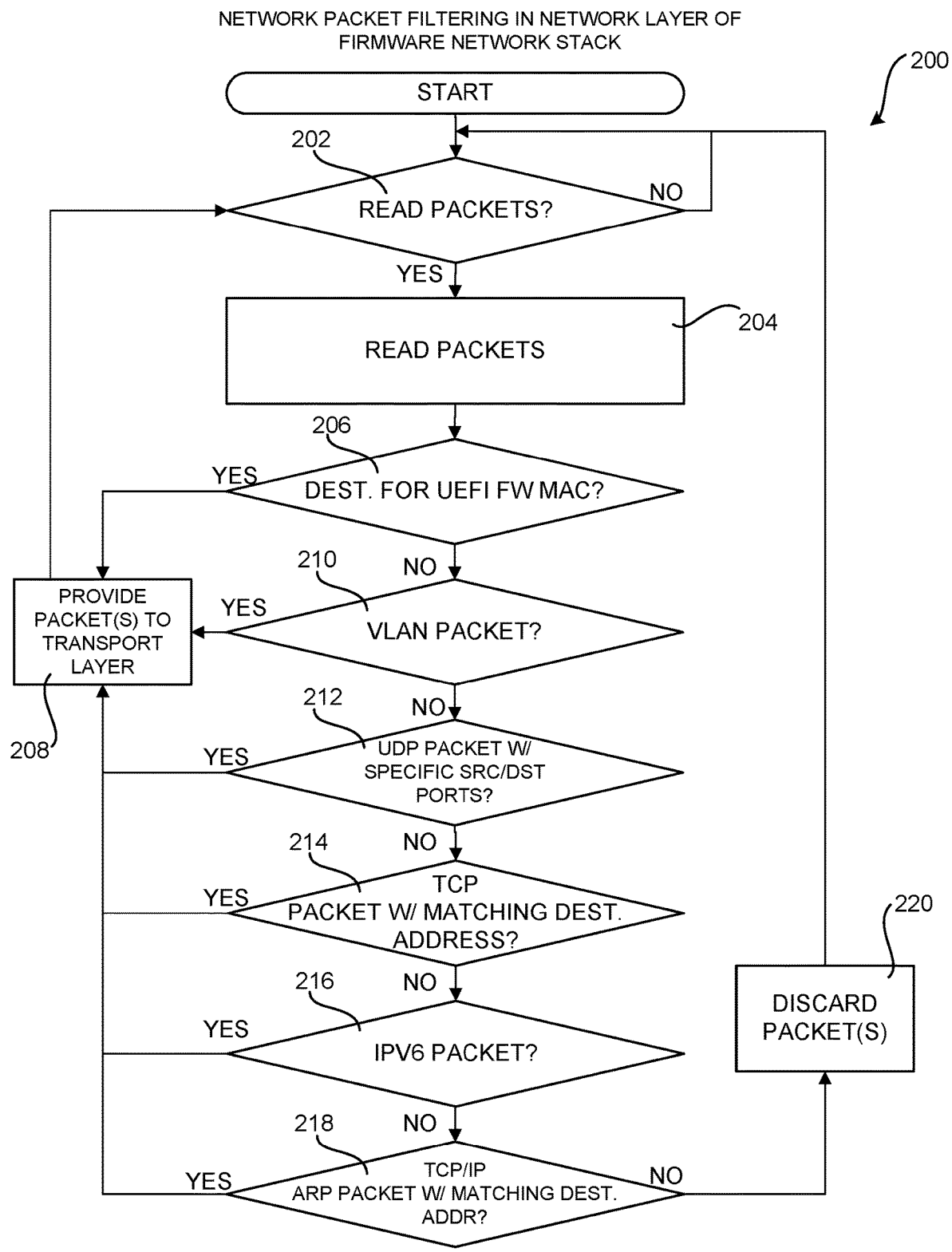
FIG. 2 is a flow diagram that illustrates aspects of the mechanism shown in FIG. 1 for filtering network packets in a network layer of a network stack provided by a firmware, according to one embodiment.

FIG. 2 is a flow diagram showing a routine 200 that illustrates aspects of the mechanism shown in FIG. 1 for filtering network packets 132 in a network layer 106 of a network stack 100 provided by a firmware, such as that described below with respect to FIGS. 4 and 5. It should be appreciated that the logical operations described herein with regard to FIG. 2 and the other FIGS. are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein.

The routine 200 begins at operation 202, where a determination is made as to whether network packets 132 are to be read from the physical layer 102. Packets 132 might be read, for example, in response to a request from an application executing within the firmware or in response to the expiration of a timer. If packets 132 are to be read, the routine 200 proceeds to operation 204, where the SNP driver 120 obtains the packets 132 from the UNDI driver 118. In some configurations, the UNDI driver 118 maintains a buffer of packets 132. The SNP driver 120 can obtain all or a portion of the packets 132 stored in the buffer. The routine 200 then proceeds from operation 204 to operation 206 where individual packets 132 are processed in the manner described below.

At operation 206, the SNP driver 120 determines whether a received packet 132 includes a destination MAC address associated with the pre-boot execution environment (e.g. a MAC address that is being used by the firmware). If so, the SNP driver 120 provides the packet 132 to the MNP driver 122 which, in turn, passes the packet 132 to the ARP driver 126 or the IP 4/6 driver 124. The packet 132 can then be passed to the transport layer 130 at operation 208. If the destination MAC address specified in the received packet 132 is not associated with the pre-boot execution environment provided by the firmware, the packet 132 is not provided to the transport layer 106 (at this time), and the routine 200 proceeds from operation 206 to operation 210.

At operation 210, the SNP driver 120 determines whether the network packet 132 is a VLAN packet. If the network packet 132 is a VLAN packet, the routine 200 proceeds from operation 210 to operation 208, where the SNP driver 120 provides the packet 132 to the MNP driver 122 which, in turn, passes the packet 132 to the ARP driver 126 or the IP 4/6 driver 124. The packet 132 can then be passed to the transport layer 130. If the packet 132 is not a VLAN packet, the packet 132 is not provided to the transport layer 106 (at this time), and the routine 200 proceeds from operation 210 to operation 212.

At operation 212, the SNP driver 120 determines whether the network packet 132 is a broadcast network packet (e.g. a UDP packet) without a destination MAC address and having one or more specific source or destination port numbers. If the packet 132 is a broadcast network packet without a destination MAC address and having one or more specific source or destination port numbers, the routine 200 proceeds to operation 208, where the SNP driver 120 provides the packet 132 to the MNP driver 122 which, in turn, passes the packet 132 to the ARP driver 126 or the IP 4/6 driver 124. The packet 132 can then be passed to the transport layer 130. If the packet 132 is not a broadcast network packet without a destination MAC address and having one or more specific source or destination port numbers, the packet 132 is not provided to the transport layer 106 (at this time), and the routine 200 proceeds from operation 212 to operation 214.

At operation 214, the SNP driver 120 determines whether the received network packet 132 is a TCP packet with a specific destination network address. If the packet 132 is a TCP packet with a specific destination network address, the routine 200 proceeds from operation 214 to operation 208 where the SNP driver 120 provides the packet 132 to the MNP driver 122 which, in turn, passes the packet 132 to the ARP driver 126 or the IP 4/6 driver 124. The packet 132 can then be passed to transport layer 130. If the packet 132 is not a TCP packet with a specific destination network address, the packet 132 is not provided to the transport layer 106 (at this time), and the routine 200 proceeds from operation 214 to operation 216.

At operation 216, the SNP driver 120 determines whether the received network packet 132 is an IPv6 packet. If the packet 132 is an IPv6 packet, the routine 200 proceeds from operation 216 to operation 208 where the SNP driver 120 provides the packet 132 to the MNP driver 122 which, in turn, passes the packet 132 to the ARP driver 126 or the IP 4/6 driver 124. The packet 132 can then be passed to transport layer 130. If the packet 132 is not an IPv6 packet, the packet 132 is not provided to the transport layer 106 (at this time), and the routine 200 proceeds from operation 216 to operation 218.

At operation 218, the SNP driver 120 determines whether the received network packet 132 is ARP packet with a specific destination network address (e.g. the current network address used by the firmware). If the packet 132 is an ARP packet with a specific destination network address, the routine 200 proceeds from operation 216 to operation 208 where the SNP driver 120 provides the packet 132 to the MNP driver 122 which, in turn, passes the packet 132 to the ARP driver 126 or the IP 4/6 driver 124. The packet 132 can then be passed to the transport layer 130. If the packet 132 is not an ARP packet with a specific destination network address, the packet 132 is not provided to the transport layer 106, and the routine 200 proceeds from operation 218 to operation 220, where the packet is discarded (e.g. not provided to the transport layer 108 and destroyed). From operations 208 and 220, the routine 200 proceeds back to operation 202, where additional packets 132 can be processed in the manner described above.

Figure 3:
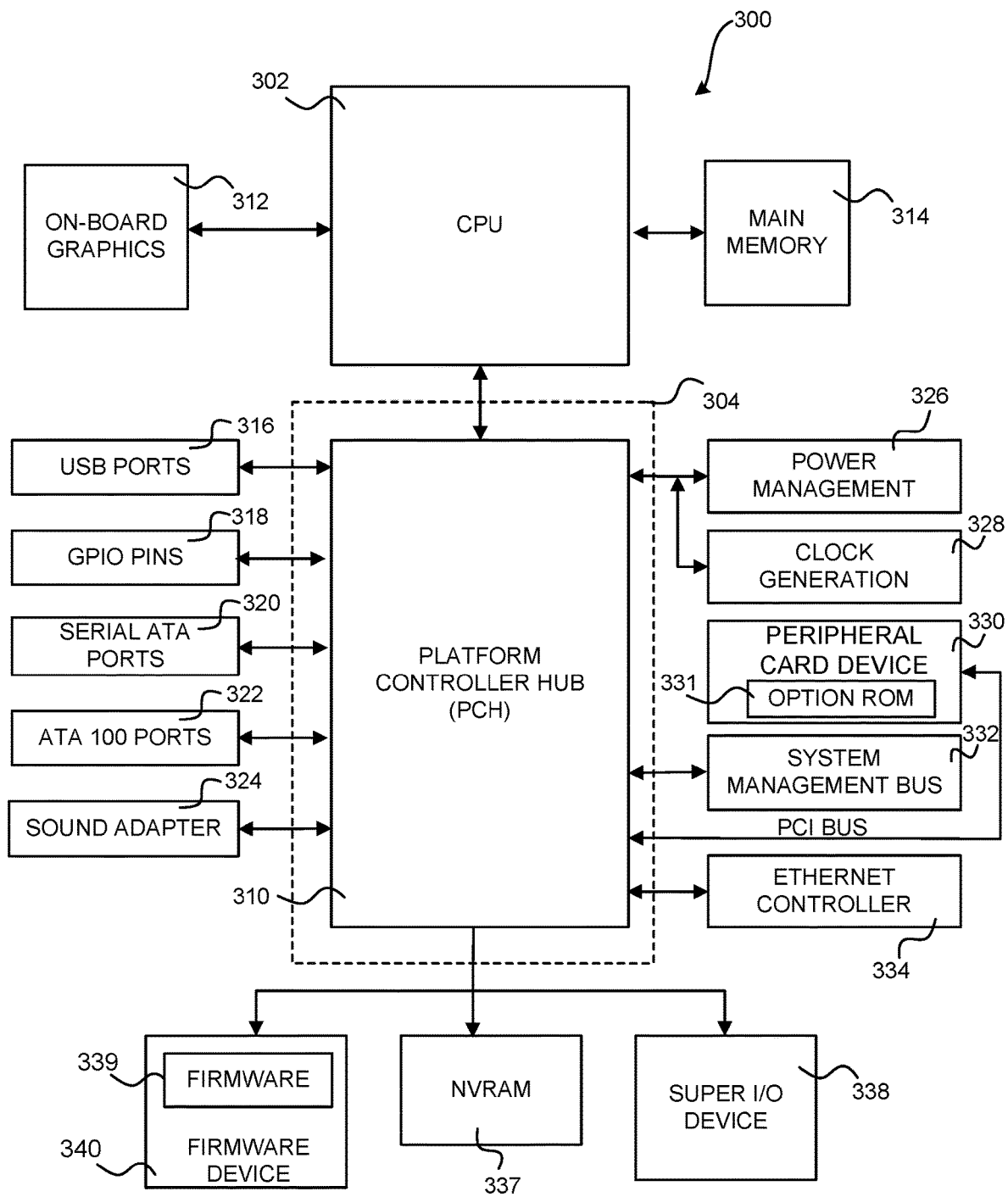
FIG. 3 is a computer architecture diagram that illustrates various components of a computing device for providing the functionality disclosed herein.

Referring now to FIG. 3, an illustrative computer architecture for a computer capable of implementing the various technologies discussed herein will be described. It should be appreciated that although the configurations described herein are discussed primarily in the context of a conventional desktop, laptop, or server computer, the configurations can be utilized with virtually any type of computing device that utilizes a firmware, such as a UEFI-compliant firmware, to control aspects of its operation.

In order to provide the functionality described herein, the computer 300 can include a baseboard, or motherboard (not shown in FIG. 3). The motherboard can be a printed circuit board to which some or all of the components shown in FIG. 3 can be connected by way of a system bus or other electrical communication path.

In one illustrative configuration, the motherboard includes one or more central processing units ("CPU") 302 configured to operate in conjunction with a chipset 304. The CPU 302 can be a central processor that performs arithmetic and logical operations necessary for the operation of the computer. For example, the CPU 302 might be a CPU available from INTEL CORPORATION, AMD CORPORATION, or a CPU based upon the ARM architecture from ARM HOLDINGS. Other types of CPUs might also be utilized. In some configurations, the CPU 302 includes an interface to a random access memory ("RAM") used as the main memory 314 in the computer 300 and, possibly, to an on-board graphics adapter 312

In one implementation, the chipset 304 includes a platform controller hub ("PCH") 310. The PCH 310 provides an interface between the CPU 302 and the remainder of the computer 300. The PCH 310 can also provide functionality for enabling networking communication through an Ethernet controller 334, or another type of network interface. The Ethernet controller 334 is capable of connecting the computer 300 to another computer via a network. Connections that can be made by the Ethernet controller 334 can include local area network ("LAN") or wide area network ("WAN") connections. LAN and WAN networking environments are commonplace in offices, enterprise-wide computer networks, intranets, and the Internet.

The PCH 310 can also include components for controlling many of the input/output functions of the computer 300. In particular, the PCH 310 can provide one or more universal serial bus ("USB") ports 316, a sound adapter 324, the Ethernet controller 334, and one or more general purpose input/output ("GPIO") pins 318. The PCH 304 can also provide a system management bus 332 for use in managing the various components of the computer 300. Power management circuitry 326 and clock generation circuitry 328 can also be utilized during the operation of the PCH 310.

The PCH 310 can also provide a bus for interfacing peripheral card devices or add-in cards 330, such as a SCSI host bus adapter. In one configuration, the bus comprises a peripheral component interconnect ("PCI") bus. It should be appreciated that other types of add-in cards compliant with other types of bus standards might also be utilized. The add-in card 330 might also include an option ROM 331. As known to those skilled in the art, the option ROM 331 of an add-in card 330 contains program code executable by the CPU 302, such as a firmware driver that is used to connect the device to the system once the option ROM 331 is loaded.

The PCH 310 can also provide one or more interfaces for connecting mass storage devices to the computer 300. For instance, according to an configuration, the PCH 310 includes a serial advanced technology attachment ("SATA") adapter for providing one or more SATA ports 320 and an ATA100 adapter for providing one or more ATA100 ports 322. The SATA ports 320 and the ATA100 ports 322 can be, in turn, connected to one or more mass storage devices (not shown in FIG. 3) storing an OS and application programs. As known to those skilled in the art, an OS comprises a set of programs that control operations of a computer and allocation of resources. An application program is software that runs on top of the OS and uses computer resources made available through the OS to perform application-specific tasks.

The mass storage devices connected to the PCH 310 and the SCSI host bus adapter 330, and their associated computer-readable storage media, can provide non-volatile storage for the computer 300. In addition to these mass storage devices, the computer 300 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 300.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Encoding the program modules can also transform the physical structure of the storage media. The specific transformation of physical structure can depend on various factors in different implementations of the disclosed technologies. Examples of such factors can include, but are not limited to: the technology used to implement the storage media; whether the storage media are characterized as primary or secondary storage; and the like. For example, if the storage media are implemented as semiconductor-based memory, the program modules can transform the physical state of a semiconductor memory when the software or firmware is encoded therein. In one particular example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

It should be appreciated that the program modules disclosed herein can include software instructions that, when loaded into the CPU 302 and executed, transform a general-purpose computing system into a special-purpose computing system customized to facilitate all, or part of, the operations disclosed herein. As detailed throughout this description, the program modules can provide various tools or techniques by which the computer 300 can participate within the overall systems or operating environments using the components, logic flows, and/or data structures discussed herein.

As also shown in FIG. 3, a low pin count ("LPC") interface can also be provided by the PCH 310 for connecting a "Super I/O" device 338. The Super I/O device 338 is responsible for providing a number of I/O ports, including, but not limited to, a keyboard port, a mouse port, a serial interface, a parallel port, and other types of I/O ports. The LPC interface can also connect a firmware device such as a ROM, EPROM, or a flash memory such as a non-volatile random access memory ("NVRAM") for storing the firmware 339 that includes program code containing the routines that help to start up the computer 300 and to transfer information between elements within the computer 300. As discussed above, in one configuration the firmware 339 is a firmware that is compliant with the UEFI Specification.

The LPC interface can also be utilized to connect a NVRAM 337 to the computer 300. The NVRAM 337 can be utilized by the firmware 339 to store configuration data for the computer 300. The configuration data for the computer 300 can also be stored on the same device as the firmware 339 in some configurations.

The computer 300 can be implemented as an embedded control computer, a laptop, a server computer, a mobile device, a set-top box, a kiosk, a tablet or slate computing device, a vehicular information system, a mobile telephone, a customized machine, or other hardware platform. The CPU 302 can be a general purpose processor, a processor core, a multiprocessor, a multi-core processor, a graphics processor, a digital signal processing ("DSP") processor, a customized computing device implemented within an application specific integrated circuit ("ASIC"), a customized computing device implemented within a field programmable gate array ("FPGA"), a customized computing device implemented within any type of programmable logic, a state machine, a reconfigurable processor, any other processing unit, or any combination or multiplicity thereof.

The CPU 302 can be constructed from transistors and/or other circuit elements, which can individually or collectively assume any number of states. More specifically, the CPU 302 can operate as a state machine or finite-state machine. Such a machine can be transformed to a second machine, or a specific machine, by loading executable instructions contained within the program modules (e.g. the modules making up the firmware 339). These computer-executable instructions can transform the CPU 302 by specifying how the CPU 302 transitions between states, thereby transforming the transistors or other circuit elements constituting the CPU 302 from a first machine to a second machine, wherein the second machine can be specifically configured to perform the operations disclosed herein. The states of either machine can also be transformed by receiving input from one or more user input devices, network interfaces, other peripherals, other interfaces, or one or more users or other actors. Either machine can also transform states, or various physical characteristics of various output devices such as printers, speakers, video displays, or otherwise.

It should be appreciated that the various technologies disclosed herein can be implemented within other types of computing devices, including hand-held computers, embedded computer systems, smartphones, tablet or slate computing devices, personal digital assistants, or another type of computing device. It is also contemplated that the computer 300 might not include all of the components shown in FIG. 3, can include other components that are not explicitly shown in FIG. 3, or can utilize an architecture completely different than that shown in FIG. 3.

Referring now to FIG. 4, a software architecture diagram will be described that illustrates aspects of an interface between a firmware 339, such as a UEFI-compliant firmware, and an operating system 402 according to one or more configurations presented herein. As described above, a firmware 339 can include a UEFI-compliant firmware that is compliant with the UEFI Specification. The term "UEFI Specification" as used herein refers to both the EFI Specification developed by INTEL CORPORATION and the UEFI Specification managed by the UEFI FORUM.

The UEFI Specification describes an interface between the operating system 402 and the firmware 339. The UEFI Specification also defines an interface that the firmware 339 can implement, and an interface that the operating system 402 can use while booting. How the firmware 339 implements the interface can be left up to the manufacturer of the firmware. The UEFI Specification also defines a way for the operating system 402 and firmware 339 to exchange information necessary to support the operating system boot process.

According to some configurations, both a UEFI-compliant firmware 339 and a legacy BIOS support module 408 can be present. This allows the computer 300 to support a UEFI firmware interface and a legacy BIOS firmware interface. In order to provide this functionality, an interface 412 can be provided for use by legacy operating systems and applications. According to other configurations, only one of the UEFI-compliant firmware 339 and the legacy BIOS support module 408 are present in the firmware. According to yet other configurations, the firmware 339 can interface with the platform hardware 410 through any of various other architectures, components, or modules for the firmware without specific involvement of the UEFI-compliant firmware or the legacy BIOS support module 408. Additional details regarding the operation and architecture of a UEFI Specification-compliant firmware can be found in the UEFI Specification.

Turning now to FIG. 5, a block diagram will be described that illustrates an architecture for a UEFI Specification-compliant firmware that provides an operating environment for one or more configurations presented herein. As shown in FIG. 5, the architecture can include platform hardware 516 and an operating system 502. The firmware 339 can retrieve an operating system ("OS" or "O/S") image from the UEFI system partition 518 using a UEFI operating system loader 502. The UEFI system partition 518 can be an architecturally shareable system partition that provides a file system designed to support safe sharing of mass storage between multiple vendors. An OS partition 520 can also be utilized. The UEFI Specification defines the structure of the UEFI system partition 518.

Once started, the UEFI OS loader 502 can continue to boot the complete operating system 502. In doing so, the UEFI OS loader 502 can use UEFI boot services 504 and interface to other supported specifications to survey, comprehend, and initialize the various platform components and the operating system software that manages them. Thus, interfaces 514 from other specifications can also be present on the system. For example, the Advanced Configuration and Power Management Interface ("ACPI") and the System Management BIOS ("SMBIOS") specifications can be supported.

UEFI boot services 504 can provide interfaces for devices and system functionality used during boot time. UEFI runtime services 506 can also be available to the UEFI OS loader 502 during the boot phase. For example, a set of run time services can be presented that support variables, time/date, capsule, reset, and the like. UEFI allows extension of platform firmware by loading UEFI driver and UEFI application images which, when loaded, have access to UEFI-defined runtime and boot services.

It should be appreciated that technologies have been disclosed herein for filtering network packets 132 in a network layer 106 of a network stack 100 provided by a firmware 339. It should also be appreciated that while the subject matter presented herein has been described primarily in the context of a pre-boot execution environment provided by a UEFI Specification-compliant firmware, it is to be understood that the configurations disclosed herein are not limited to use with a UEFI Specification-compliant firmware. Similar configurations can be utilized in other pre-boot firmware execution environments, such as that provided by a firmware compliant with the OPEN FIRMWARE specification or another type of open or proprietary firmware.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes can be made to the subject matter described herein without following the example configurations illustrated and described, and without departing from the true spirit and scope of the present invention, which is set forth in the following claims.

The invention claimed is:

1. A non-transitory computer-readable storage medium having computer-executable instructions stored thereupon which, when executed by a computer, cause the computer to:
   provide a network protocol stack in a pre-boot execution environment, the pre-boot execution environment provided by a unified extensible firmware interface (UEFI)-compliant firmware;
   receive a plurality of network packets at a network layer in the network protocol stack;
   determine whether individual ones of the plurality of network packets received at the network layer meet one or more pre-defined criteria;
   in response to determining that the individual ones of the plurality of network packets received at the network layer meet the one or more pre-defined criteria, provide the individual ones of the plurality of network packets according to the one or more pre-defined criteria to a transport layer in the network protocol stack; and
   in response to determining that the individual ones of the plurality of network packets received at the network layer do not meet the one or more pre-defined criteria, discard the individual ones of the plurality of network packets.

2. The non-transitory computer-readable storage medium of claim 1, wherein at least one of the one or more pre-defined criteria comprises the individual ones of the plurality of network packets having a media access control (MAC) address associated with the pre-boot execution environment.

3. The non-transitory computer-readable storage medium of claim 1, wherein at least one of the one or more pre-defined criteria comprises the individual ones of the plurality of network packets comprising virtual local area network (VLAN) packets.

4. The non-transitory computer-readable storage medium of claim 1, wherein at least one of the one or more pre-defined criteria comprises the individual ones of the plurality of network packets having one or more specific destination port numbers.

5. The non-transitory computer-readable storage medium of claim 1, wherein at least one of the one or more pre-defined criteria comprises the individual ones of the plurality of network packets comprising transmission control protocol (TCP) packets having a specific destination network address or address resolution protocol (ARP) packets having a specific destination network address.

6. The non-transitory computer-readable storage medium of claim 1, wherein at least one of the one or more pre-defined criteria comprises the individual ones of the plurality of network packets comprising internet protocol version 6 (IPv6) packets.

7. The non-transitory computer-readable storage medium of claim 1, wherein the network layer provides data routing paths for network communication and the transport layer provides host-to-host communications services for applications.

8. An apparatus comprising:
   a central processing unit (CPU); and
   a firmware device storing a unified extensible firmware interface (UEFI)-compliant firmware which, when executed by the CPU, will cause the CPU to:
     provide a network protocol stack in a pre-boot execution environment, the pre-boot execution environment provided by the UEFI-compliant firmware;
     receive a plurality of network packets at a network layer in the network protocol stack;
     determine whether individual ones of the plurality of network packets received at the network layer meet one or more pre-defined criteria;
     in response to determining that the individual ones of the plurality of network packets received at the network layer meet the one or more pre-defined criteria, provide the individual ones of the plurality of network packets according to the one or more pre-defined criteria to a transport layer in the network protocol stack; and
     in response to determining that the individual ones of the plurality of network packets received at the network layer do not meet the one or more pre-defined criteria, discard the individual ones of the plurality of network packets.

9. The apparatus of claim 8, wherein at least one of the one or more pre-defined criteria comprises the individual ones of the plurality of network packets having a media access control (MAC) address associated with the pre-boot execution environment.

10. The apparatus of claim 8, wherein at least one of the one or more pre-defined criteria comprises the individual ones of the plurality of network packets comprising a network packet having one or more specific destination port numbers.

11. The apparatus of claim 8, wherein at least one of the one or more pre-defined criteria comprises the individual ones of the plurality of network packets comprising transmission control protocol (TCP) packets having a specific destination network address.

12. The apparatus of claim 8, wherein at least one of the one or more pre-defined criteria comprises the individual ones of the plurality of network packets comprising internet protocol version 6 (IPv6) packets.

13. The apparatus of claim 8, wherein the network layer provides data routing paths for network communication and the transport layer provides host-to-host communications services for applications.

14. A computer-implemented method, comprising:
providing a network protocol stack in a pre-boot execution environment;
receiving a plurality of network packets at a network layer in the network protocol stack;
determining whether individual ones of the plurality of network packets are destined for a media access control (MAC) address associated with the pre-boot execution environment;
responsive to determining that individual ones of the plurality of network packets are destined for a MAC address associated with the pre-boot execution environment, providing the individual ones of the plurality of network packets according to the one or more pre-defined criteria to a transport layer in the network protocol stack; and
responsive to determining that individual ones of the plurality of network packets are not destined for a MAC address associated with the pre-boot execution environment, not providing the individual ones of the plurality of network packets to the transport layer.

15. The computer-implemented method of claim 14, further comprising:
responsive to determining that individual ones of the plurality of network packets are not destined for a MAC address associated with the pre-boot execution environment, determining whether individual ones of the plurality of network packets comprise virtual local area network (VLAN) packets; and
responsive to determining that the individual ones of the plurality of network packets comprise VLAN packets, providing the individual ones of the plurality of network packets to the transport layer.

16. The computer-implemented method of claim 15, further comprising:
responsive to determining that the individual ones of the plurality of network packets do not comprise VLAN packets, determining whether individual ones of the plurality of network packets are broadcast network packets without a destination MAC address and having one or more specific port numbers; and responsive to determining that individual ones of the plurality of network packets are broadcast network packets without a destination MAC address and having one or more specific port numbers, providing the individual ones of the plurality of network packets to the transport layer.

17. The computer-implemented method of claim 16, further comprising:
responsive to determining that individual ones of the plurality of network packets are not broadcast network packets without a destination MAC address and having one or more specific port numbers, determining whether individual ones of the plurality of network packets are transmission control protocol (TCP) packets with a specific destination network address; and
responsive to determining that individual ones of the plurality of network packets are transmission control protocol (TCP) packets with a specific destination network address, providing the individual ones of the plurality of network packets to the transport layer.

18. The computer-implemented method of claim 17, further comprising:
responsive to determining that individual ones of the plurality of network packets are not TCP packets with a specific destination network address, determining whether individual ones of the plurality of network packets are internet protocol version 6 (IPv6) packets; and
responsive to determining that individual ones of the plurality of network packets are IPv6 packets, providing the individual ones of the plurality of network packets to the transport layer.

19. The computer-implemented method of claim 18, further comprising:
responsive to determining that individual ones of the plurality of network packets are not IPv6 packets, determining whether individual ones of the plurality of network packets are address resolution protocol (ARP) packets with a specific destination network address; and
responsive to determining that individual ones of the plurality of network packets are ARP packets with a specific destination network address, providing the individual ones of the plurality of network packets to the transport layer.

20. The computer-implemented method of claim 18, wherein the network layer provides data routing paths for network communication and the transport layer provides host-to-host communications services for applications.

* * * * *